April 9, 1968   G. M. CUNDY   3,377,074
SEALS FOR MACHINE SHAFTS
Filed Oct. 11, 1965   2 Sheets-Sheet 1

INVENTOR:
G. M. Cundy
BY
Richards & Geier
ATTORNEYS

April 9, 1968  G. M. CUNDY  3,377,074
SEALS FOR MACHINE SHAFTS
Filed Oct. 11, 1965  2 Sheets-Sheet 2

INVENTOR:
G. M. Cundy
BY
Richards & Geier
ATTORNEYS

United States Patent Office 3,377,074
Patented Apr. 9, 1968

3,377,074
SEALS FOR MACHINE SHAFTS
Graeme Maxwell Cundy, 49 Glen Road, Devonport,
Auckland, New Zealand
Filed Oct. 11, 1965, Ser. No. 494,690
8 Claims. (Cl. 277—32)

ABSTRACT OF THE DISCLOSURE

A shaft seal includes a cylindrical flexible portion having an outer thick annular flange adapted to engage a machine part and an inner thick annular disc having a thin inner circumferential margin constituting a sealing lip.

---

This invention relates to machine shaft seals, also known as oil seals, and to bearings with such seals.

An object of the invention is to provide a machine shaft seal or oil seal, of lip type, suitable for such purposes as retaining lubricant in a bearing, which will accommodate fluid pressure changes without excessive disturbance of the sealing lip and thus reduce the liability of the seal to allow leakage of lubricant and admission of dirt. Another object is to provide such a seal which is adaptable to shaft eccentricity and misalignment and a further object is to promote active lubrication of a shaft bearing provided with such a seal.

According to the invention, a machine shaft seal, or oil seal, consists of a moulded annular casing of resilient material, such as rubber, having a substantially cylindrical wall portion for mounting by one end on a machine part and at the other end formed with a circumferential sealing lip portion, the wall portion being more flexible than the sealing lip portion so that it will more easily yield to a difference in fluid pressure between the inside and outside of the casing and thus, within limits, permit change in the contained volume of the casing, in response to such difference in fluid pressure, substantially without distortion of the sealing lip and consequent displacement of fluid past the sealing lip.

Preferably, the sealing lip portion of the seal mainly consists of an integral annular disc which is substantially thicker, and therefore more rigid, than the cylindrical wall portion and the sealing lip consists of an integral, relatively thin and flexible, circumferential margin of the annular disc.

Figures 1, 2:
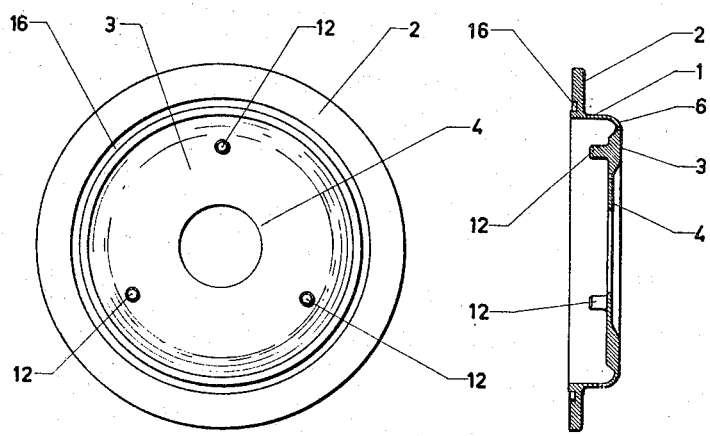
Figures 3, 4, 5, 6:
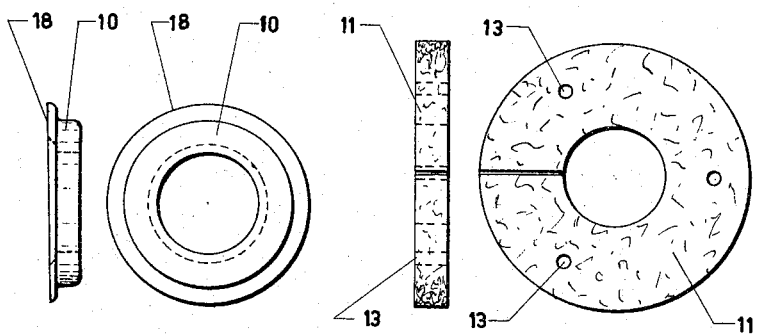
Figures 7, 8:
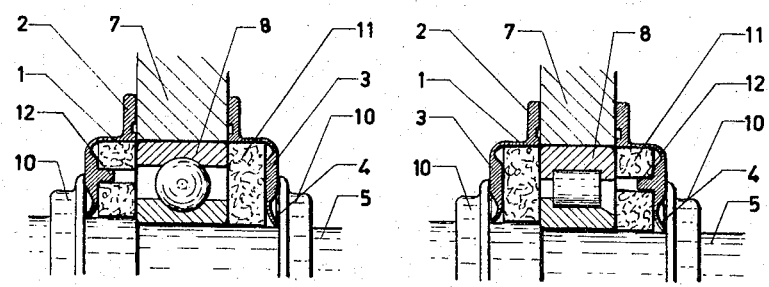
Figure 9:
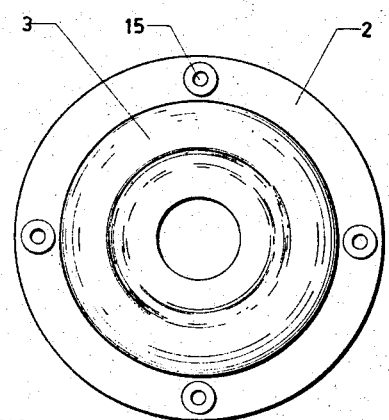
Figure 10:
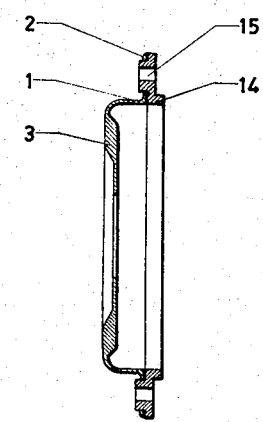
Figure 11:
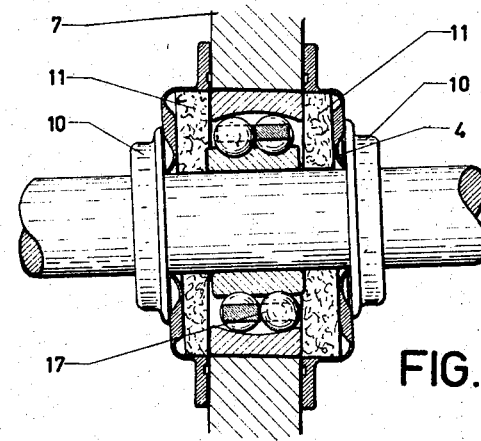
Figure 12:
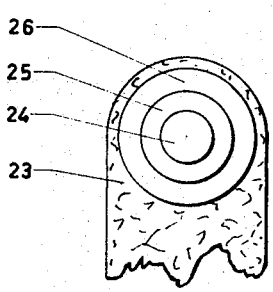
Figure 13:
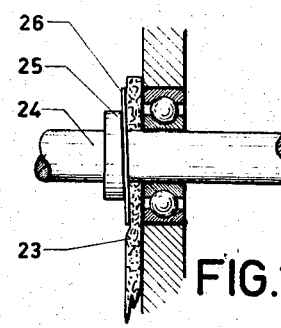

Other features of the invention are included in the following desription with reference, by way of example, to the accompanying drawings, in which:

FIGURES 1 and 2 are respectively a side elevation and an axial section of a seal according to the invention, FIGURES 3 and 4 are, respectively, a side elevation and an end elevation of a shaft collar for use in combination with a seal, FIGURES 5 and 6 are, respectively, a side elevation and an end elevation of a lubricant holding disc for incorporation with a seal according to the invention, FIGURES 7 and 8 are, respectively, half axial sections of shaft bearings fitted with seals according to the invention, FIGURES 9 and 10, are, respectively, an end elevation and an axial section of an alternative form of seal according to the invention, FIGURE 11 is an axial section of a bearing illustrating accommodation of seals to misalignment of a shaft and FIGURES 12 and 13 are, respectively, an end elevation and an axial section of a bearing showing a lubricant supply feature of the invention.

The seal shown by FIGURES 1 and 2 consists of a moulded annular casing, of oil-resistant synthetic rubber or the like, having a cylindrical wall portion 1 with a transversely radial, relatively thick, integral flange 2 at one end, for mounting of the seal on a machine part, and at the other end an annular, relatively thick, integral disc 3 with a relatively thin and flexible, inner circumferential margin forming a sealing lip 4 designed to embrace and make sealing contact by its edge with the cylindrical surface of a machine shaft 5.

Preferably, as shown by FIGURE 2, the wall portion 1 merges into the disc 3 without increase of thickness through a smooth bend 6.

When the casing has an adhesive face on the flange 2 for fastening the flange is grooved (16) FIGURES 1 and 2. This groove arrests any lubricant tending to flow over this face while the unit is being fitted, a slightly raised land makes a high pressure contact first when the unit is being stuck and this further stops oil contaminating the adhesive.

A seal, a pair of seals, can be mounted, as shown in FIGURES 7 and 8, on a housing member 7 of a ball or roller bearing 8 for a shaft 5 on which may be mounted, for each seal, a collar 10 which bears axially against the disc 3 of the seal to afford further sealing and maintain the seal in alignment with the shaft. The disc 3 may have embedded in the outer surface thereof a metal or other stiffening and wear-resistant rigid washer (not shown) as a bearing surface against the collar 10.

There is preferably provided as a close fit in the annular cavity of each seal, an annular disc 11 (see FIGURES 5 and 6) of a sponge-like material, such as plastics foam, to hold lubricant accessible to the bearing. The disc 3 of the seal is preferably moulded with pins 12 (FIGURES 7 and 8) to engage as locating spigots in holes 13 in the lubricant-holding disc 11.

As shown in an alternative form, by FIGURES 9 and 10, the mounting flange 2 may be bonded to a metal or other rigid flange ring 14 having holes 15 for studs to secure the seal in position on a housing member, such as 7, or other relatively fixed machine part. FIGURE 10 shows a unit of this type incorporating a spigoted metal insert which can locate the outer race of the bearing. In a similar version, the rubber lips over the metal to form a gasket.

FIGURE 11, which shows a pair of seals on a self-aligning bearing 17, illustrates how the relatively thin and flexible wall portion 1 of each seal permits the disc 3 to tilt and move axially without disturbance of alignment and sealing contact of the lip 4 with the shaft 5. The collar 10 preserves axial alignment of the disc 3 of the seal with the shaft.

In a similar manner, the disc 3 of the seal can move axially, without disturbance of alignment and sealing efficiency of the lip 4, in response to a change or difference of fluid pressure inside and outside the seal. Such a change in fluid pressure is likely to arise when the temperature of a bearing increases in use. The seal of the present invention, due to the relative flexibility of its cylindrical wall, can undergo variation of the contained volume of its casing without disturbance of its sealing lip and thus reduces the risk of outward leakage of lubricant on heating and ingress of dirt on cooling.

FIGURE 11 also illustrates how the lubricant-holding disc 11 can deform under the axial thrust of the disc 3 by the collar 10 and this can be utilised to displace lubricant to and fro between the bearing and the disc 11, with a kind of pumping action, thus promoting action lubrication of the bearing.

In order to obtain a similar pumping action independently of any shaft angular oscillations, the collar 10 can be made as a face cam, see FIGURE 3, the end face 18 of the collar being machined to a plane surface slightly oblique to the axis. Only a very small obliquity is required, the angle being exaggerated in FIGURE 3 for the purposes of illustration.

The obliquely-faced collar 10, as the shaft rotates, acts as a face cam which slightly oscillates the seal disc 3 against the lubricant-holding disc 11 to exert a rotary squeezing action thereon. By arranging diametrically opposite the high points of the collars 10 against a pair of seals at either end of a bearing, the pumping action will be substantially equal and opposite on both discs 11 and the total volume available for lubricant will not substantially vary. The effect of the pumping action will be a displacement of lubricant to and fro in the bearing.

The collars 10 may be mouldings of nylon or similar material and may each be an interference press fit on a shaft. They may however be split or divided for fitting. Preferably the high points of their oblique faces are marked, such as by a pip on the back face, to facilitate correct adjustment.

FIGURES 12 and 13 illustrate how the cam and disc rotary pumping feature of the invention can be applied to the supply of lubricant to a bearing 22 by providing a sponge or felt feeding-member or wick 23 which dips by its lower end (not shown) into a lubricant sump and has an annular portion around a shaft 24 on which a face-cam collar 25 oscillates an annular disc or washer 26 to squeeze the member 23 and exert a rotary pumping action on the lubricant therein to augment capillary feed of lubricant through the wick 23 to the bearing.

What is claimed is:

1. A shaft seal or oil seal consisting of a moulded annular casing of resilient material, such as rubber, having a substantially cylindrical wall portion for mounting by one end on a machine part and at the other end formed with a circumferential sealing lip portion, the wall portion being more flexible than the sealing lip portion so that it will more easily yield to a difference in fluid pressure between the inside and outside of the casing and thus, within limits, permit change in the contained volume of the casing, in response to such difference in fluid pressure, substantially without distortion of the sealing lip and consequent displacement of fluid past the sealing lip, wherein the end of the cylindrical wall portion which is formed for mounting on a machine part comprises an integral flange.

2. A seal according to claim 1, in which the end of the cylindrical wall portion which is formed for mounting on a machine part has bonded thereto a rigid flange ring.

3. A seal according to claim 1, comprising a resilient lubricant-holding member contained in the casing and, in which the casing is moulded with locating pins for the lubricant-holding member.

4. A seal according to claim 1, in combination with a member which maintains close proximity to at least a part of the annular casing, thus providing further sealing in the form of a labyinth and affording a face contact seal, said member having the form of a shaft collar and being relatively rotatable and in which the member bears axially against the sealing lip or portion of the annular casing to maintain alignment of the seal with the shaft when the shaft or bearing mounting is displaced angularly.

5. A seal according to claim 1, comprising a resilient lubricant-holding member contained in the casing and maintaining contact with at least said annular casing to provide further sealing, in combination with a relatively-rotatable cam device which, on relative rotation, deforms the annular casing against the resilient lubricant-holding member so as to effect a lubricant-pumping action thereon.

6. A seal according to claim 5 in which the relatively rotatable cam device is a shaft collar forming a face cam.

7. A seal according to claim 6 in which the shaft collar is a shaft collar which bears axially against the sealing lip or portion of the annular casing to maintain alignment of the seal with the shaft when the shaft or bearing mounting is displaced angularly.

8. A seal according to claim 7 in which the member or cam device is in the form of a shaft collar moulded of nylon or like material and is an interference fit on the shaft.

References Cited

UNITED STATES PATENTS

| 2,275,307 | 3/1942 | Marden | 277—82 |
| 2,887,330 | 5/1959 | Cobb | 277—32 |
| 2,893,770 | 7/1959 | Poncet | 277—182 |

FOREIGN PATENTS

| 1,221,175 | 1/1960 | France. |
| 513,506 | 10/1939 | Great Britain. |

SAMUEL ROTHBERG, *Primary Examiner.*